United States Patent [19]
Kent

[11] 3,759,004
[45] Sept. 18, 1973

[54] GLAZING WINDOW OR WINDSCREEN OPENINGS, PARTICULARLY IN VEHICLE BODIES

[75] Inventor: Cecil Kent, Woking, England

[73] Assignee: Creators Limited, Surrey, England

[22] Filed: Apr. 20, 1971

[21] Appl. No.: 135,574

Related U.S. Application Data

[63] Continuation-in-part of Ser. No. 865,428, Oct. 10, 1969, Pat. No. 3,705,470, which is a continuation-in-part of Ser. No. 827,633, May 26, 1969, abandoned.

[30] Foreign Application Priority Data

Apr. 23, 1970 Great Britain............... 19644/70

[52] U.S. Cl...................... 52/400, 52/402, 52/403, 52/716
[51] Int. Cl............................................. B60j 1/00
[58] Field of Search................... 52/400, 716, 717, 52/718, 208, 402, 403, 393; 49/492; 296/93

[56] References Cited
UNITED STATES PATENTS

| | | | |
|---|---|---|---|
| 3,037,810 | 6/1962 | Kelly | 52/716 |
| 3,455,080 | 7/1969 | Meadows | 52/716 |
| 2,647,289 | 8/1953 | Harbert | 52/208 |
| 3,442,059 | 5/1969 | Kessler | 52/403 |
| 3,245,182 | 4/1966 | Zierold | 52/393 |
| 2,056,024 | 9/1936 | Staut | 52/400 |
| 3,155,204 | 11/1964 | Campbell et al. | 52/397 |
| 3,274,740 | 9/1966 | Hall | 52/208 |
| 2,683,905 | 7/1954 | Beck | 52/476 |

FOREIGN PATENTS OR APPLICATIONS

| | | | |
|---|---|---|---|
| 1,013,322 | 12/1965 | Great Britain | 52/208 |
| 979,707 | 1/1965 | Great Britain | 52/400 |
| 496,050 | 9/1953 | Canada | 52/400 |

*Primary Examiner*—Frank L. Abbott
*Assistant Examiner*—Leslie A. Braun
*Attorney*—Larson, Taylor & Hinds

[57] ABSTRACT

The invention relates to glazing window or windscreen openings, particularly in vehicle bodies by securing the glass, with a trim strip surrounding its edge, in the rebate of the opening by means of an adhesive pressed between the glass and/or the trim strip and the rebate. The trim strip is made of flexible plastics material with a channel portion which embraces the edge of the glass, and a front decorative strip portion which extends from and can hinge relative to the edge of the front wall of the channel portion which lies on the inside of the trim strip when it is fitted around the glass. The outer edge of the front portion bears against the rebate. By this construction the inside edge of the trim strip is kept against the glass, and any tendency to buckling is avoided.

13 Claims, 16 Drawing Figures

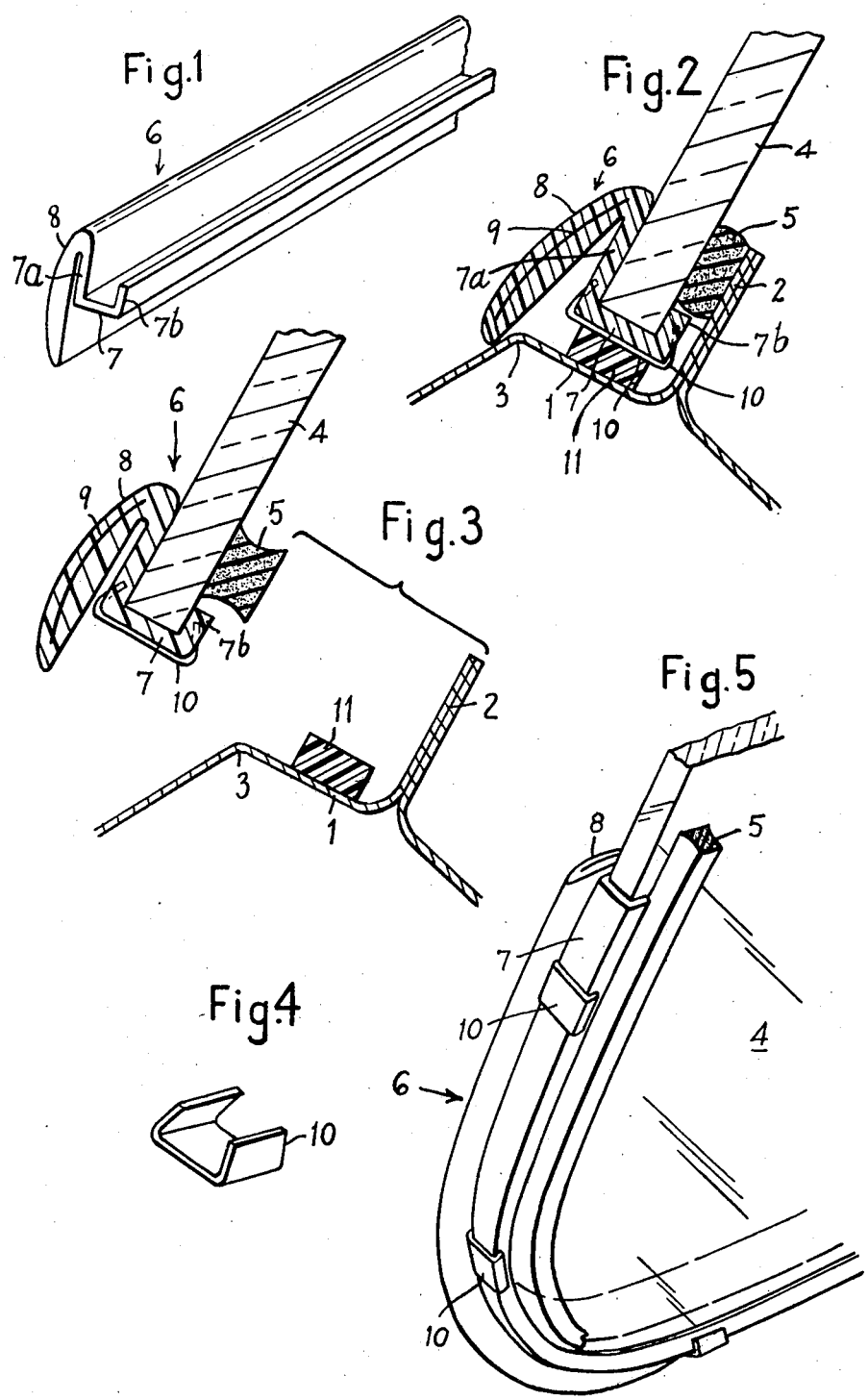

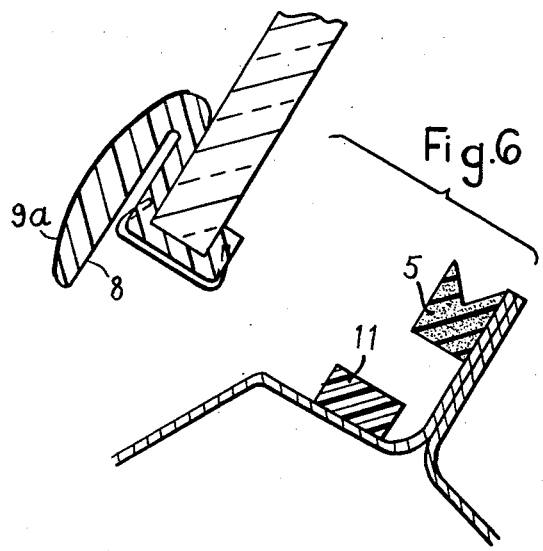
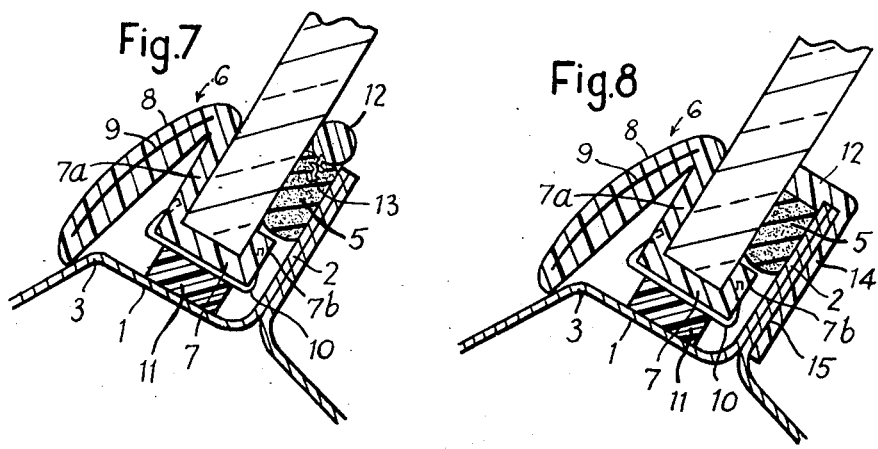
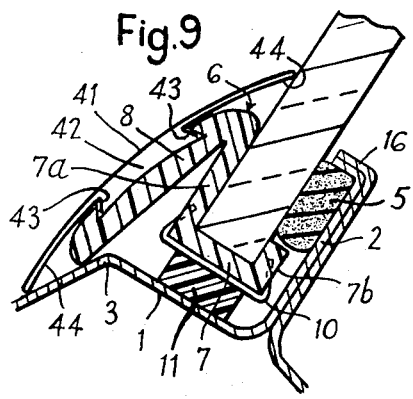
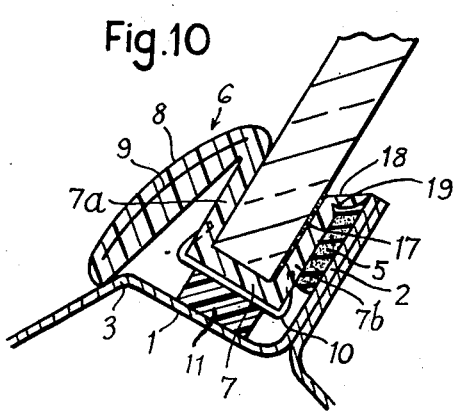

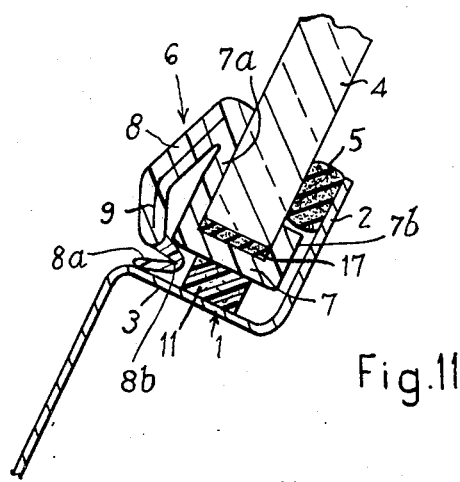
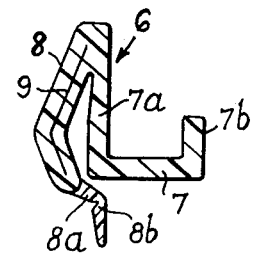
Fig. 11
Fig. 12
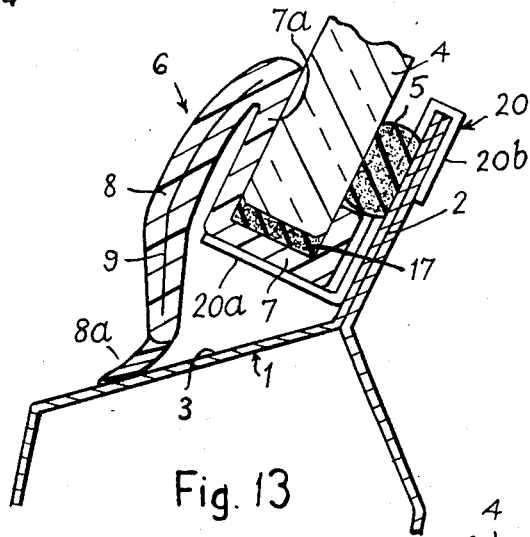
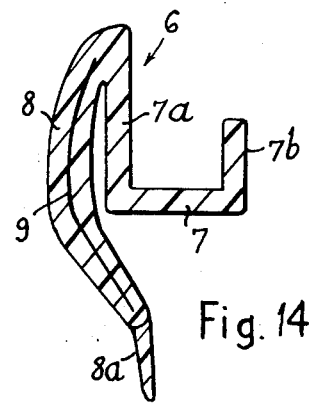
Fig. 13
Fig. 14
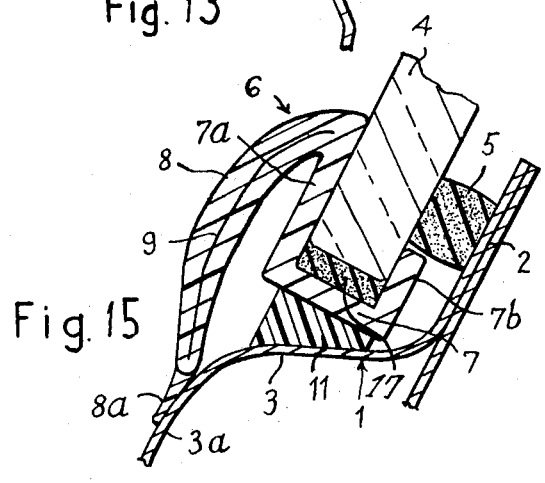
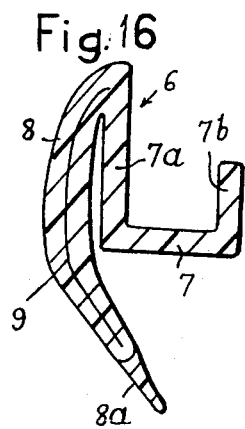
Fig. 15
Fig. 16

3,759,004

BLAZING WINDOW OR WINDSCREEN OPENINGS, PARTICULARLY IN VEHICLE BODIES

RELATED APPLICATIONS

This application is a continuation-in-part of my copending application Ser. No. 865,428 for IMPROVEMENTS IN GLAZING WINDOWS OR WINDSCREEN OPENINGS, PARTICULARLY IN VEHICLE BODIES filed Oct. 10, 1969, now U.S. Pat. No. 3,705,470, issued Dec. 12, 1972 which is itself a continuation-in-part of my copending application Ser. No. 827,633 for IMPROVEMENTS IN GLAZING WINDOWS OR WINDSCREEN OPENINGS, PARTICULARLY IN VEHICLE BODIES filed May 26, 1969 and now abandoned.

SUMMARY OF THE INVENTION

The present invention relates to glazing window or windscreen openings, particularly in vehicle bodies, in which the glass (which term is used herein to include other transparent materials) is secured in the rebate of the opening with the aid of an adhesive, and a trim strip made of rubber or a flexible plastics material surrounds the edge of the glass.

The invention is particularly concerned with the construction of the trim strip and to methods of glazing using this trim strip.

The trim strip according to the invention is made preferably by extrusion, of a flexible plastics material, such as polyvinyl chloride, or a rubber-like elastomer, and comprises a channel portion dimensioned to embrace the edge of the glass and a front strip portion which extends from the edge of the front wall of the channel, that is the wall which is to lie against the outer surface of the glass, so as to overlie said front wall and project beyond the base of the channel, said front strip portion being free to flex away from said front wall of the channel about its junction with said edge of said front wall. Such flexing occurs when the edge of the front strip portion which projects below the channel base engages with the front of the rebate when the glass, with the trim strip fitted around its periphery, is inserted in the rebate to stick the glass therein. The front strip portion thus encloses the space between the edge of the glass and the rebate, and the fact that the flexing of the front strip portion relative to said front wall occurs along the inner edge of the trim strip, when it is fitted around the edge of the glass, ensures that the inner edge of the trim strip is urged close against the glass, even around curves at the corners of the glass panel, as well as providing pressure contact between the free outer edge of the front strip portion and the front of the rebate.

The invention also consists in a window or windscreen assembly in which the glass is secured with the aid of an adhesive in a rebate defining an opening in which the glass is fitted and the edge of the glass is surrounded by a trim strip of a flexible plastics material or a rubber-like elastomer comprising a channel portion embracing the edge of the glass and a front strip portion which extends from the inner edge of the front wall of the channel portion, which lies against the front of the glass, in a direction which overlies said front wall, the free edge of the said front strip portion engaging the front of the rebate.

According to a feature of the invention the channel portion of the trim strip is additionally secured to the edge of the glass by retaining clips which are sprung or clamped over the channel portion at selected positions around the edge of the glass and/or by adhesive applied between the glass and the inside of the channel portion.

The front strip portion is preferably provided with a decorative metallic appearance. For example, the trim strip may be extruded of a transparent or translucent plastics material and have a metal foil, for example aluminum foil, embedded therein so as to be visible through the front surface of the front strip portion, or a decorative metallised plastics foil or metal-plastics foil laminate may be bonded to the front surface of said front strip portion.

The invention also consists in a method of glazing a window or windscreen opening in the form of a rebate having a back wall and a front shoulder, which consists in assembling a trim strip as above described around a glass panel with the edge of the glass panel braced by the channel portion of the trim strip, inserting the assembly into the rebate with at least one layer of adhesive between the back wall of the rebate and a zone of the back of the glass panel which is disposed behind and hidden by the front strip portion of the trim strip, and moving the assembly into the opening firstly to bring the free edge of said front strip into contact with the front shoulder of the rebate and then to flex the front strip portion away from the channel portion and to exert pressure on said at least one layer of adhesive to stick the glass panel to the back wall of the rebate.

In order that the invention may be more clearly understood, reference will now be made to the accompanying drawings, in which :

FIG. 1 is a perspective view of a trim strip according to the invention.

FIG. 2 is a scrap section through a part of an automobile body windscreen opening with the glazing completed according to this invention.

FIG. 3 is a view similar to FIG. 2 but showing the glazing assembly and body opening in exploded relation prior to securing the glazing assembly in the body opening according to one procedure for carrying out the method of this invention.

FIG. 4 is a perspective view of a spring retaining clip.

FIG. 5 is a scrap perspective view of the glass and trim strip assembly of FIG. 3 prior to its insertion in the body opening.

FIG. 6 is a view similar to FIG. 3, but showing a modified procedure of assembly in which the adhesive is initially applied to the back of the rebate instead of to the back of the glass.

FIG. 7 to 10 are views, similar to FIG. 2, showing various modifications.

FIGS. 11, 13 and 15 are views, similar to FIG. 2, showing further embodiments, and FIGS. 12, 14 and 16 are sections through the trim strips shown in FIGS. 11, 13 and 15 respectively, as extruded.

Referring to FIGS. 1 to 5 of the drawings, 1 represents part of a vehicle body adjacent the windscreen opening formed by a rebate having a back wall 2 and a front shoulder 3. The glass 4 is stuck to the rear wall 2 of the rebate by a mass of adhesive sealant 5, for example a butyl rubber adhesive sealant, or it may be of the thermosetting type. Surrounding the edge of the glass panel 4 is a trim strip 6 extruded of a flexible plastics material, such as polyvinyl chloride, with the configuration shown in FIG. 1. As shown it comprises a channel-shaped portion 7 adapted to embrace the edge of the glass. From the top edge or lip of the front wall 7a of this channel portion extends a front strip portion 8, which overlies said front wall and is wider than the depth of the front wall 7a so that its free edge projects beyond the base of the channel portion sufficiently to engage against the front 3 of the rebate when the glass and trim strip assembly is inserted in the windscreen opening, the front strip portion thereby enclosing the space between the edge of the glass and the rebate. The plastics material joining the front strip portion 8 and said edge or lip forms a flexible hinge junction which, being the only connection between the front strip portion and the channel portion, allows the front strip portion 8 to flex away from the front wall 7a, as shown in FIG. 2, when the assembly is pressed in to the rebate with the free edge of the front strip portion bearing against the front 3 of the rebate.

The rear wall 7b of the channel portion is of less depth than the front wall 7a so that the adhesive 5 can be applied to the back of the glass around a zone adjacent the edge thereof which lies behind and will be hidden by the front wall 7a and front strip portion 8.

The front strip portion 8 is preferably constructed to provide a decorative metallic appearance to which end, in the embodiment shown in FIGS. 2 and 3, the extrusion is made of a transparent material such as crystal clear polyvinyl chloride, with a strip of aluminum foil 9 embedded or encapsulated in said front strip portion so that its bright surface is visible through the front thereof.

In another embodiment, as shown in FIG. 6, the decorative metallic appearance is provided by bonding a decorative layer 9a, e.g., a strip of metal foil covered with a transparent protective layer, to the front surface of the front strip portion 8. The decorative layer 9a may consist of a metal-plastics foil laminate comprising a strip of metal foil, e.g., aluminum foil, laminated between two layers of plastics foil of which at least one is transparent, e.g., transparent P.V.C., or MYLAR (Trade Mark) and forms the front surface when the laminate is bonded to the front strip portion 8, and of which the other is capable of being bonded by adhesive and/or heat to the front surface of the front strip portion 8. The laminate may also be constructed as described in the specification of my co-pending application Ser. No. 845,155 filed July 28, 1969 for "Decorative Plastics Strips and Extrusions." When the decoration is provided by bonding a decorative layer to the front of the front strip portion 8, as shown in FIG. 6, it is not necessary for the trim strip 6 to be extruded from transparent plastics material.

The trim strip which extends completely around the edge of the glass, may be additionally secured to the glass by adhesive and/or by retaining clips 10, conveniently spring metal clips, as shown in FIG. 4, fixed at suitably selected positions around the edge of the glass. These clips may be applied by a preloaded hand tool dispenser.

According to one procedure for carrying out the method of this invention, the glass, prior to assembly in the rebate, has the trim strip fitted around the edge thereof and the adhesive 5 applied to the back thereof as shown in FIG. 3 to form an assembly as shown in FIG. 5. This assembly is then offered up to the rebate so that the bottom of the channel 7 rests on spacer supports 11 secured to the bottom of the rebate, and the assembly is pressed inwards to press the adhevive 5 against the back wall 2 of the rebate. During this operation the front strip portion 8 is flexed away from the front wall 7a of the channel portion 7 to the position shown in FIG. 2 by reason of the free edge of the front strip portion coming into engagement with the front 3 of the rebate. The supports 11 may comprise blocks of rubber or plastics material stuck to the bottom of the rebate.

According to another procedure for carrying out the method of this invention, the adhesive 5 is, as shown in FIG. 6, initially applied to the back of the rebate instead of to the back of the glass. The glass with the trim strip fitted around the edge thereof, is offered up to the rebate to rest on the spacer supports 11, and the glass is pressed against the adhesive and bonded thereto. Again during this operation the front strip portion 8 of the trim strip is flexed away from the front wall 7a as shown in FIG. 2.

If desirable for the adhesive used, a coating of a primer may be applied to the zones on the back of the glass and the back of the rebate where the adhesive is to be adhered. Also, depending on the adhesive used, a curing or other setting operation may be required firmly to stick the glass in the rebate. The adhesive is conveniently applied in the form of a ribbon and preferably has a cross-section which is tubular or waisted (as shown in FIG. 3) or has a groove, such as a V-groove as shown in FIG. 6, in order to improve its compressibility and to avoid the adhesive spewing out too much or over the rebate when the adhesive is compressed between the glass and the back of the rebate.

One adhesive which we have found to be satisfactory is the butyl rubber adhesive sealant known as "PTI Auto Glass Tape" made by Protective Treatments Inc. of Dellrose Ave., Dayton, Ohio, U.S.A.

If it be desired to cover the mass of adhesive 5 where it is exposed between the back of the glass and the edge of the back wall 2 of the rebate, this may be effected by applying a further interior trim strip thereover.

For example, as shown in FIG. 7, this interior trim strip 12 may comprise a body portion, of any desired cross-section, which bridges the space between the back of the glass and the back wall 2 of the rebate, and is provided with a web 13 extending along its length (the web may be of "fir tree" cross-section as shown) which is embedded in the mass of adhesive 5. The interior trim strip, which may if desired be provided with a decorative metallic finish, may be pressed into the mass of adhesive after the glass has been inserted in to the window opening.

In another modification as shown in FIG. 8, the interior trim strip 12 is provided with a skirt portion 14 which extends over the edge of the back wall 2 of the rebate and may be secured, for example by sticking, to the surface 15 of the back wall 2 which faces the interior of the vehicle body. The body portion of the interior trim strip may simply be adhered to the mass of adhesive 5, or may also be provided with a web portion 13, similar to that of the embodiment of FIG. 7, which is embedded in the mass of adhesive.

FIG. 9 shows another method of covering in the mass of adhesive 5. In this embodiment, the edge of the back wall 2 of the rebate is formed with an outwardly projecting lip or flange 16 which extends around the window opening and overlies the mass of adhesive. The width of the lip or flange 16 is preferably such that a small clearance is left between the edge of the lip and the back of the glass when the glass is secured in the rebate.

Instead of applying the adhesive directly between the back of the glass and the back of the rebate, the channel portion 7 of the trim strip may be stuck to the glass and the said channel portion be secured by adhesive to the back of the rebate. In this case it is not necessary that the rear channel wall 7b should be of less depth than the front channel wall 7a.

An embodiment of this modification is illustrated in FIG. 10, in which the rear channel 7b, which is made deeper than the rear channel wall in the embodiment of FIG. 2, have its inner surface stuck to (a recess may be provided in said inner surface to receive the the back of the glass by an adhesive indicated at 17, adhesive), and the outer surface of the rear channel wall is secured to the back wall 2 of the rebate by a mass of adhesive 5. In the embdoiment shown, the rear channel wall 7b is provided at its top with a rearwardly directed lip 18 which is adapted to engage the back wall 2 of the rebate and enclose the mass of adhesive. A groove 19 may be formed at the junction between the top of the rear wall 7b and the lip 18 to facilitate the flexing of the lip when it engages the back wall 2 of the rebate.

In all embodiments, by reason of the hinge junction between the channel portion 7 and the front strip portion 8 being on the inner edge of the trim strip, when the trim strip is secured around the glass, the flexing of the front strip portion 8 away from the front wall 7a of the channel portion, when the assembly is secured in position, has the effect of causing the inner and outer edges of the front strip portion to be pressed into firm contact with the glass 4 and front 3 of the rebate respectively, even around the radius to which the trim strip is bent at the corners of the glass panel.

Further, by reason of the free outer edge of the front strip portion 8 being free of any reinforcing flange or enlargement such as is provided by the hinge junction with the channel portion at the inner edge of the front strip portion, and that only the said inner edge is so reinforced, the said free outer edge, and zones of the front strip portion across its width between its free outer edge and the hinge junction at its inner edge, are free to stretch sufficiently when the trim strip is bent around the normal radius at the corners of a windscreen, to avoid buckling of the inner edge of the front strip portion around such bends. The decorative metal foil also stretches across its width, to increasing degrees towards said free outer edge of the front strip portion, without any noticeable compression of the foil adjacent the inner edge of the front strip portion, whereby crinkling of the metal foil around bends of normal radius is avoided.

The rather flat or shallow convex cross-section of the front strip portion 8, and the fact that the inner and outer edges of the front strip portion lie snugly against the glass and the front of the rebate respectively, assist in reducing windscreen wind noise.

To facilitate fitting the trim strip around the edge of the glass panel a length of the trim strip, corresponding to the length of the periphery of the glass panel, may be pre-bent to the shape of the panel. The bent strip can be easily fitted around the edge of the windscreen panel. The ends of the strip are joined and aligned by means of an appropriate clip, and spring clips 10 may be fitted at each side of the join and at such other positions around the windscreen panel as may be necessary.

While particular embodiments have been described, it will be understood that various modifications may be made without departing from the scope of the invention. For example, the trim strip could be made of two or more extruded sections, of the same or different materials, which could be bonded together during extrusion or subsequently to form the complete unitary trim strip of this invention.

Further, as shown in FIG. 9, the front of the trim strip may have a facing 41 of metal, e.g., stainless steel, or other suitable material secured thereto, for example by an interengaging or clip connection or by adhesive. The drawing shows the front strip portion 8 as being provided with a dovetail channel 42 with which engage projecting lips 43 along the edges of the folded-back margins 44 of a stainless steel facing section 41 to hold the section 41 assembled to the trim strip 6. The facing section 41 may be wider that the front strip portion 8 which may be desirable where, at least at some places around a windscreen, an extra wide front facing is required. The metal facing section may be bent to shape before assembly to the trim strip.

In modifications of the embodiment of FIG. 10, the adhesive layer 17 may alternatively be disposed between the base of the channel portion 7 and the edge of the glass, or it may be entirely omitted between the glass and the channel portion in which case the adhesive is only disposed between the back of the rear channel wall 7b and the back wall of the rebate.

In another modification of FIG. 10, the mass of adhesive may be located, entirely or at least in part, between the base of the channel portion 7 and the opposing wall of the rebate. Bonding pressure on the adhesive may be achieved by making the base of the channel wedge-shaped or by other appropriate means.

Experience has shown that some motor cars have bodies which are designed with window openings having rebates of such configuration that a trim strip constructed as specifically described above is unsuitable for use therewith. For example, in some cars the rebate is of such a depth that it would be preferable, and sometimes even necessary, for the free outer edge to lie within the depth of the rebate and engage the peripheral wall thereof, instead of engaging the front of the rebate. Again, in some cars, the peripheral wall of the rebate does not extend substantially perpendicular to the back wall, but at a relatively large obtuse angle thereto, which requires the front strip portion of the trim strip to be made somewhat deeper than described in the above description to enable its outer free edge to engage and press firmly against a part of the body (in this case the peripheral wall itself) surrounding the window opening. This can increase the difficulty, where the front strip portion comprises a strip of metal foil or metallised plastics foil embedded therein or secured thereon, of avoiding crinkling of the metal foil where it is bent around corners of the glass panel, which difficulty increases with increase in width of the metal or metallised foil.

The present invention also provides a modified construction of trim strip which, while providing improved sealing between the free outer edge of the front strip portion and a vehicle body having a window opening rebate as shown in FIGS. 1 to 10, also overcomes the problems existing with vehicle bodies having different configurations of window opening rebates as referred to above.

This modified trim strip is characterised by a zone along the free edge of its front strip portion comprising a lip portion which is so dimensioned and shaped and-/or is made of a material or grade of material which is softer and of a more flexible nature than that of the remainder of the front strip portion that, when pressure is applied against said free edge, the lip portion will flex or bend relative to the remainder of the front strip portion more readily than said front strip portion flexes about its junction with the front wall of the channel portion of the strip. The lip portion acts as a gasket sealing against the vehicle body around the glass panel, and also compensates for tolerance variations in the dimensions of the rebate and of the glass panel.

The lip portion may be made of the same plastics material as the remainder of the front strip portion and extruded integrally therewith, being dimensioned and shaped to provide the desired flexibility. Alternatively, the lip portion may be made of a material or grade of material which is softer and of a more flexible nature than that of the remainder of the front strip portion, in which case it may, if the materials are compatible, be fused to the edge of the front strip portion, for example by simultaneously extruding both materials and bonding them together by pressure in a common die or by bringing them together, preferably under pressure, as they are being extruded through separate dies.

The lip portion and the remainder of the front strip portion may have the same or different colours. In the case where the main part of the front strip portion is made of a transparent plastics material with a metal foil or metallised plastics foil embedded therein or secured thereon, the lip portion may be made of an opaque material, of black or other desired colour, so as to obscure from view the gap therebehind or any condensation or moisture which may collect behind the lip.

Several embodiments of this modified trim strip and window assemblies incorporating this trim strip will now be described with reference to FIGS. 11 to 16.

Referring to FIGS. 11 and 12, the trim strip 6 is basically similar to the trim strip described above and comprises a channel-shaped portion 7 adapted to embrace the edge of the glass panel 4, and a front strip portion 8 which overlies the front wall 7a of the channel portion and forms a hinged junction with the top edge of said front wall 7a. Along the free edge of the front strip portion 8 is a marginal zone 8a made of a flexible material constituting a flexible lip which flexes and folds to a V-shaped or U-shaped form, as shown in FIG. 11, when the glass panel 4, with the trim strip around its edge, is inserted into the rebate 1, constituting the windscreen opening of a vehicle body, with the lip 8a pressed against the peripheral wall 3 of the rebate.

The glass panel with the trim strip around its edge is secured in the rebate by an adhesive applied in any of the ways described above. In the embodiment shown in FIG. 11, the rear wall 7b of the channel portion of the trim strip is of less depth than the front wall 7a and the assembly is secured by a mass of adhesive sealant 5, for example a butyl rubber adhesive sealant, between the back of the glass, around a zone adjacent the edge thereof which lies behind and is hidden by the front wall 7a and the front strip portion 8, and the rear wall 2 of the rebate. The trim strip may be secured to the glass by a layer 17 of adhesive between the base of the channel portion 7 and the edge of the glass. Spacer supports 11, conveniently made of plastics material or rubber, may be provided between the wall of the rebate and the base of the channel portion 7. They may be stuck to the rebate.

At least the lip 8a is preferably made of opaque material, so that the space therebehind is obscured from view.

FIG. 12 shows the cross-section of the trim strip as made, the lip 8a having its normal unflexed shape before assembly in the rebate. The main part of the front strip portion 8 is shown as being extruded of transparent polyvinylchloride, with a strip of aluminium foil 9 embedded therein, as described above, so that its bright surface is visible through the front strip portion. The lip portion 8a is extruded of a softer and more flexible grade of opaque polyvinylchloride, bonded to the free edge of the transparent front strip portion 8. By way of example, the transparent polyvinylchloride may have a softness of 5 to 10 (measured according to British Standard Specification No. 2 782, Part 3, 1957) and the lip portion a softness of 40–85, measured according to the same specification.

The two parts 8 and 8a may be fused together by simultaneously extruding the two plastics materials through the same extrusion die, or by extruding them through separate extrusion dies and bringing them into contact, preferably under applied pressure, while they are still in heat-softened condition. Alternatively the two parts may be extruded separately and the two extrusions may be bonded together by heat-softening the surfaces to be joined, by hot air jets or in any other convenient manner, and then pressing the heat-softened surfaces together.

It will be seen that the lip portion 8a is made with a cranked shape and that a groove 8b is provided along the lip portion to facilitate its bending to the desired V-shape during assembly.

In another embodiment shown in FIGS. 13 and 14, the peripheral wall 3 of the rebate, instead of being substantially perpendicular to its back wall 2 as in FIG. 11, slopes forwardly at an obtuse angle to the back wall 2. In this embodiment the front strip portion is wider than in the embodiment shown in FIGS. 11 and 12 and the lip portion 8a presses against the peripheral wall 3.

It has been found that where the bottom of the rebate slopes forwardly at more than a slight angle, spacer blocks like the spacer blocks 11 used to support the glass in the embodiment shown in FIG. 11, may slide forwards and down the peripheral wall of the rebate under the weight and vibration of the glass, even if the spacer blocks are stuck to the wall 3. If this problem arises, it may be overcome by mechanically retaining or fixing the spacer blocks against such sliding, or the glass may be supported by the bottom of the channel portion 7 resting on another kind of support which itself cannot drop under the temperature, vibration and other conditions to which it can be subjected during use of the vehicle. As shown in FIG. 13, this support is provided by a plurality of metal clips 20 (only one of which is visible) which are hooked over the back wall 2 along the bottom of the rebate, each comprising a support leg 20a integral with a hook portion 20b which fits over the back wall 2 of the rebate, the clips being spaced along the bottom of the window opening.

Instead of the flexible lip 8a pressing against the peripheral wall 3 of the rebate, it may press against the front 3a of the rebate, for example as shown in FIG. 15. The trim strip as made is shown in FIG. 16, the lip portion 8a tapering to a thin edge, and both its front and back surfaces may have a hollow configuration. This improves flexibility. Only one such surface need be hollowed, in which case it is preferably the back surface (as shown) as this assists in the lip conforming to the vehicle body and improves the sealing.

In the embodiments of FIGS. 13 to 16, the lip portions do not have to flex so much relative to the remainder of the front strip portion, as the lip portion of the embodiment of FIGS. 11-12, so that the grade of polyvinylchloride used for the lip portions of the embodiments of FIGS. 13 to 16 need not be so soft as for the embodiment of FIGS. 11-12. We have found a material having a softness of 15 - 30 (according to British Standard Specification No. 2 782, Part 3, 1957) to be satisfactory with the embodiments of FIGS. 13 to 16, the remainder of the front strip being made of transparent polyvinylchloride having the same softness as for the embodiment of FIG. 11.

According to one procedure for glazing a window or windscreen opening using the modified trim strip described with reference to FIGS. 11 to 16, the glass, prior to assembly in the rebate, has the trim strip fitted around the edge thereof. The adhesive 5 is applied either to the back of the rebate or the back of the glass. The glass and trim strip assembly is then offered up to the rebate so that the bottom of the channel 7 rests on the spacer supports 11 or the clips 20 and the assembly is pressed inwards to press the adhesive 5 between the glass and the back wall 2 of the rebate. During this operation the lip 8a presses against the peripheral wall 3 or the front 3a of the rebate, as the case may be, and flexes relative to the remainder of the front strip portion and urges the latter in a direction away from the front wall 7a of the channel portion to keep the inner edge of the front strip portion against the glass.

If it be desired to cover the mass of adhesive 5 where it is exposed between the back of the glass and the edge of the back wall 2 of the rebate, this may be effected by applying a further interior trim strip thereover.

While particular embodiments of this modified trim strip have been described, it will be understood that various modifications may be made without departing from the scope of the invention. For example, other forms of decorating the trim strip and of sticking the assembly in the rebate, as described above, may be adopted. Further the whole of the front strip portion including the lip portion 8a may be made of an opaque material or materials, of a colour or colours suitable for the vehicle body styling. The trim strip may be made of the same material throughout, of a suitable grade of hardness, the lip portion being suitably dimensioned and if necessary provided with a groove or grooves to facilitate its flexing in the desired manner when the glazing assembly is inserted in the rebate.

I claim:

1. A window assembly in which a glass panel is secured with the aid of an adhesive to a rebate having a back wall and a peripheral wall and defining an opening in which the glass is fitted, wherein the edge of the glass panel is surrounded by a trim strip of flexible plastics material comprising a channel portion having front and rear walls spaced apart by a base portion to embrace the edge of the glass and a front strip portion which extends from the edge of said front wall of the channel portion and overlies said front wall and projects beyond the base of the channel, said front strip portion being free to flex away from said front wall of the channel about its junction with said edge of said front wall and a zone along the free edge of said front strip portion comprising a lip portion which is so dimensioned and shaped and is made of a material which is softer and of a more flexible nature than that of the remainder of the front strip portion that, when pressure is applied against said free edge, the lip portion will flex or bend relative to the remainder of the front strip portion more readily than said front strip portion flexes about its junction with the front wall of the channel portion of the strip, with its channel portion embracing the edge of the glass panel and said lip portion pressing against the peripheral wall of the rebate.

2. A window assembly according to claim 1, further characterised in that the rear wall of the channel portion is of less depth than said front wall, and the adhesive is applied to the back of the glass around a zone which is hidden behind said front channel wall and said front strip portion.

3. An assembly according to claim 1, wherein the peripheral wall of the rebate is disposed substantially perpendicular to the back wall thereof, and the lip portion is folded to a V-shaped cross-section and presses against said peripheral wall.

4. An assembly according to claim 1, wherein the peripheral wall of the rebate extends at an obtuse angle to the back wall thereof.

5. A window assembly trim strip of flexible plastics material comprising:
   a. a channel portion having a front channel wall with a top edge and a rear channel wall with a top edge, said front and rear channel walls being spaced apart by a base portion such that said channel portion can embrace the edge of a pane of glass with said front channel wall lying against the front surface of the glass and the rear channel wall lying against the rear surface of the glass;
   b. a front strip portion having one edge united to said top edge of said front channel wall and forming a hinge junction therewith, and having its other edge free, said front strip portion being wider than the depth of said front channel wall and extending from said top edge of the front channel wall to overlie said front channel wall with its said other free edge projecting beyond the base of said channel portion;
   c. said front strip portion being connected to said channel portion only by said hinge junction and being free to flex away from said front channel wall about said hinge junction;
   d. said free edge of said front strip portion being free to stretch sufficiently to enable the trim strip to be bent around the corner of the glass without buckling said hinge junction edge of said front strip portion;
   e. and a strip of metal foil adjacent to the front surface of said front strip portion and covered by a transparent protective layer.

6. A trim strip according to claim 5 wherein a zone along the free edge of said front strip portion comprises a lip portion which is so dimensioned and shaped and is made of a material which is softer and of a more flexible nature than that of the remainder of the front strip portion that, when pressure is applied against said free edge, the lip portion will flex or bend relative to the remainder of the front strip portion more readily than said front strip portion flexes about its junction with the front wall of the channel portion of the strip.

7. a trim strip according to claim 6 wherein said lip is provided with at least one groove extending therealong.

8. A trim strip according to claim 6 wherein said lip portion tapers towards a thin free edge.

9. A trim strip according to claim 6 wherein said lip portion includes a front surface and a back surface and wherein at least one of the front and back surfaces of said lip portion has a hollow configuration.

10. A trim strip according to claim 5, wherein the front surface of said front strip portion is of shallow convex configuration.

11. A trim strip according to claim 5, wherein said strip of metal foil is bonded to the front surface of said front strip portion and covered by a protective layer.

12. A trim strip according to claim 5, wherein said strip of metal foil is imbedded in said front strip portion.

13. A trim strip according to claim 5, wherein said front channel wall is deeper than said rear channel wall.

* * * * *